March 13, 1962   K. REINFELD ET AL   3,025,046
SINTER APPARATUS WITH SPROCKET ADJUSTED DRIVE
Filed June 9, 1960   5 Sheets-Sheet 3

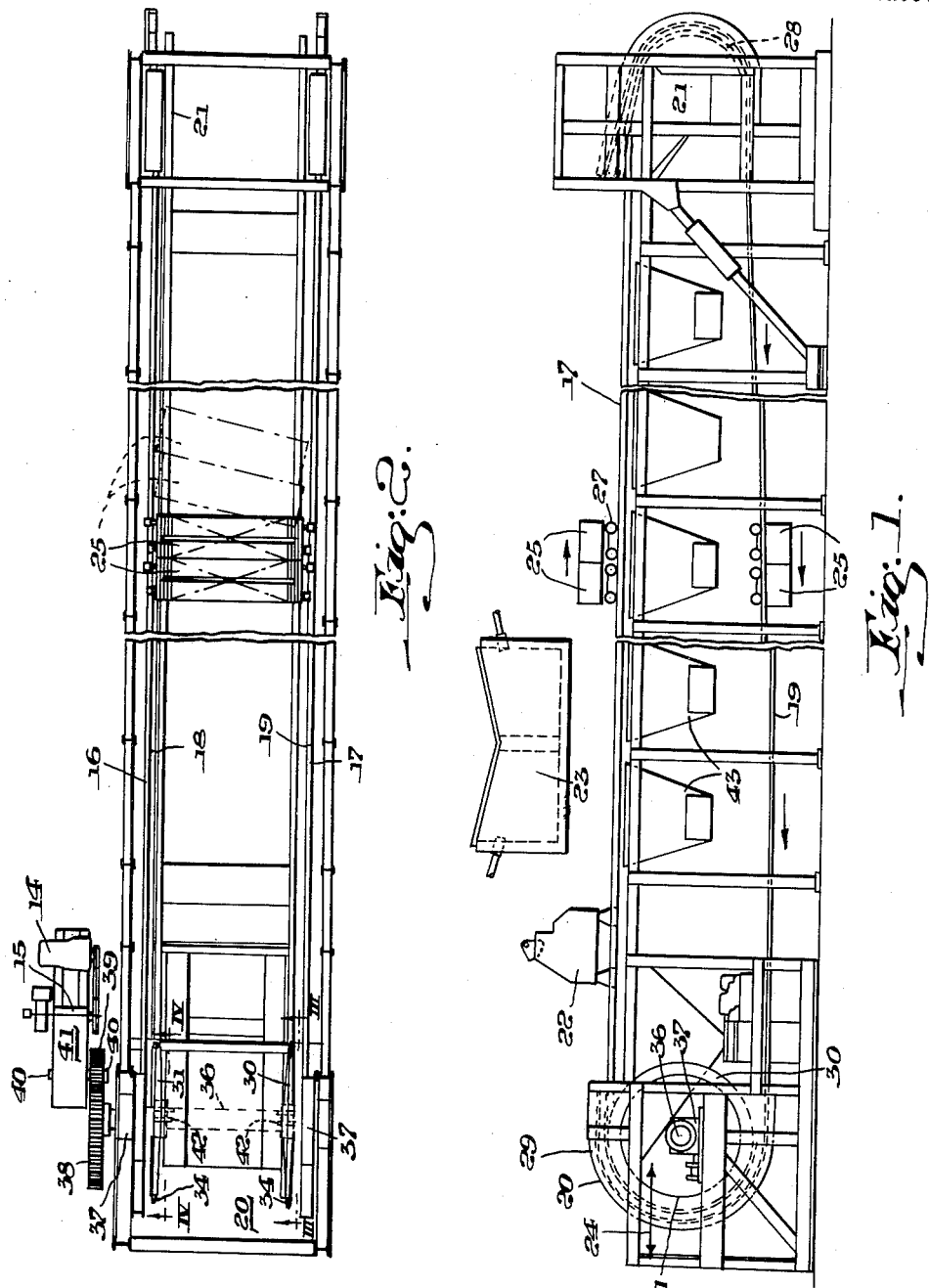

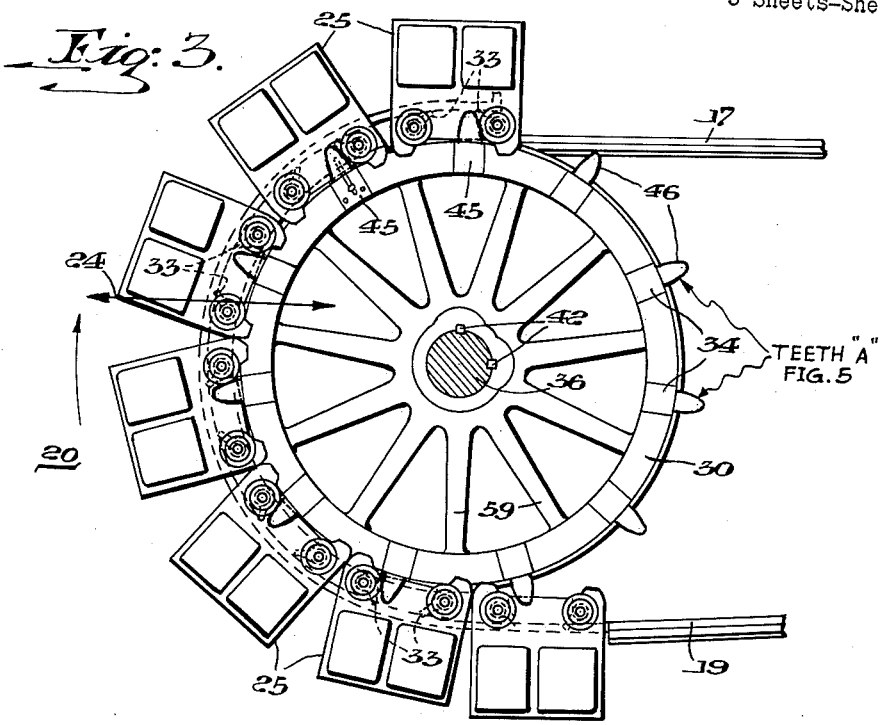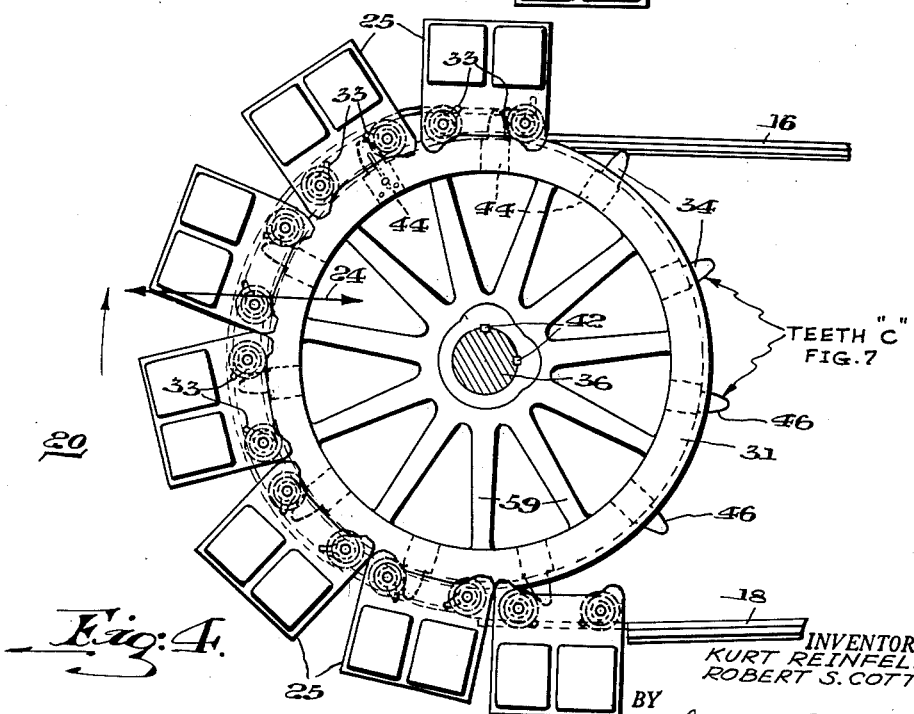

TOOTH "A" (NORMAL)

TOOTH "B"

TOOTH "C"

INVENTORS
KURT REINFELD, and
ROBERT S. COTTON.
BY Thomas J. P. O'Brien
their ATTORNEY

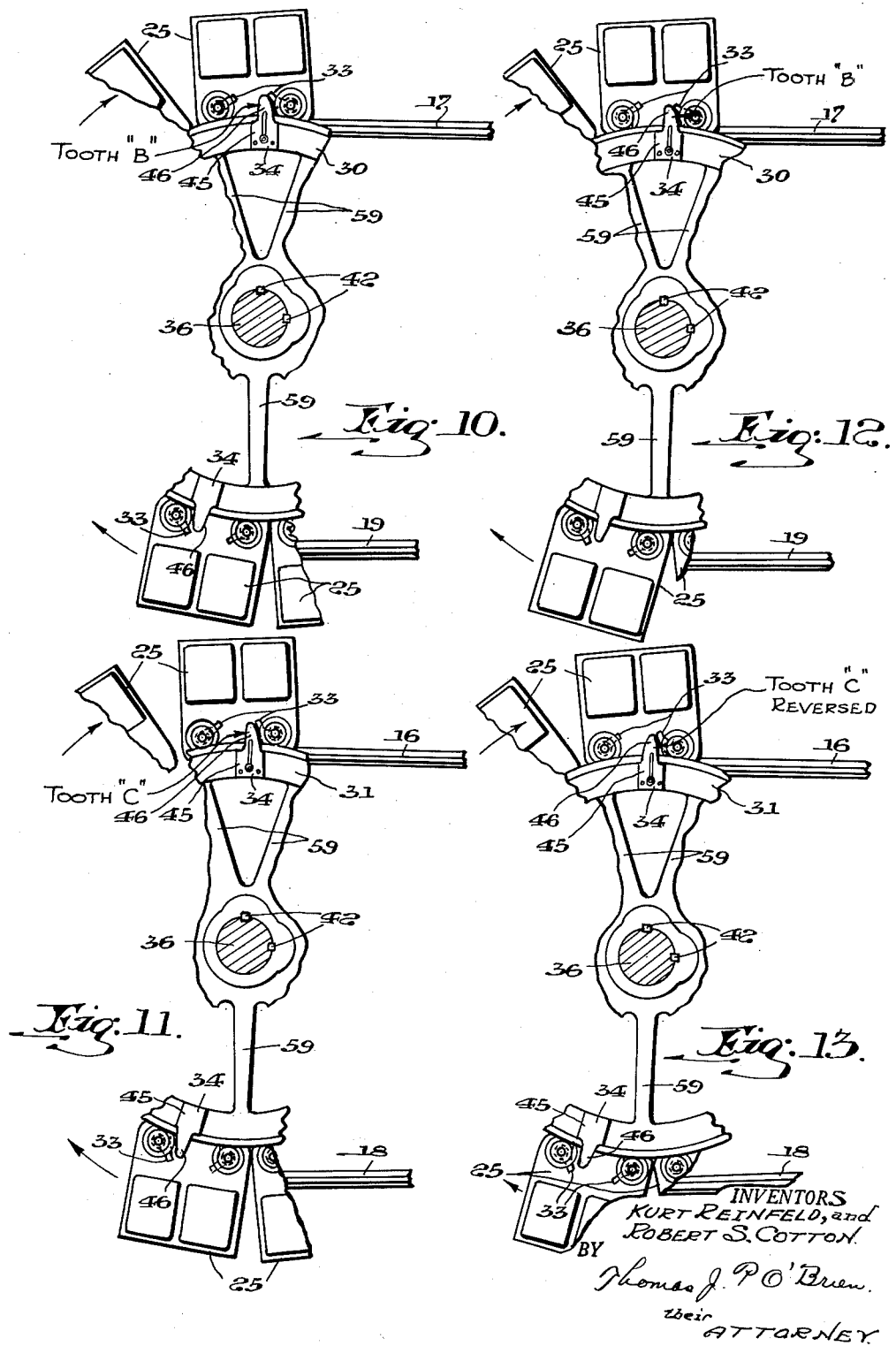

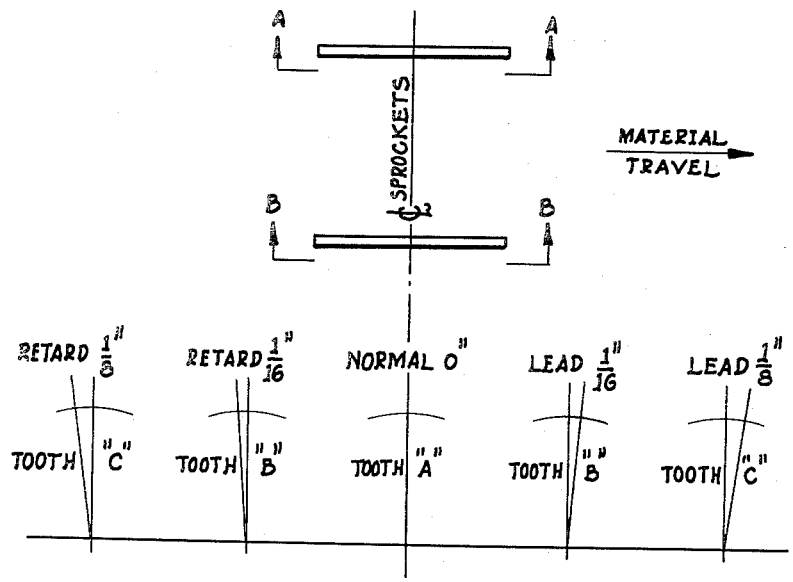
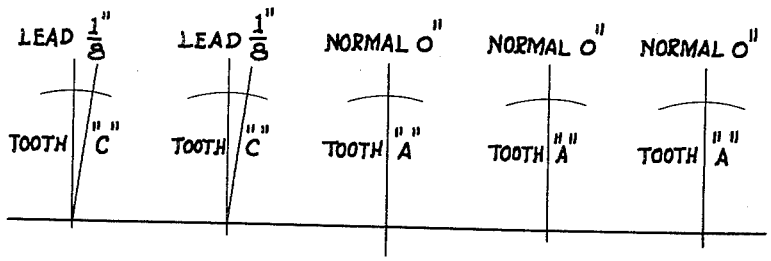
Fig. 14.

United States Patent Office 3,025,046
Patented Mar. 13, 1962

3,025,046
SINTER APPARATUS WITH SPROCKET
ADJUSTED DRIVE
Kurt Reinfeld and Robert S. Cotton, Pittsburgh, Pa., assignors to Koppers Company, Inc., a corporation of Delaware
Filed June 9, 1960, Ser. No. 34,942
8 Claims. (Cl. 266—21)

The present invention relates to improvements in continuous endless strand sinter apparatus, such as sintering machines and sinter coolers, and more particularly, to improvements in the drive thereof, whereby the driving means may be adjusted so that the sinter pallets of each apparatus can be driven evenly and not tend to jam up on one side or the other of the pallet train.

More particularly, the invention provides for the purpose, sprocket means with arcuately immovable, replaceable, or interchangeable sprocket teeth which fit tightly, as in sockets, in the sprocket wheels for film seating of the teeth, and which teeth have their leading and trailing edges disposed at different distances from the vertical axis of the tooth roots or legs when seated in aligned sockets of the sprocket wheels for the two sides of the pallets, to correct any angular displacement of the pallets, and to deliver and push the pallets along the upper run in parallelism so as to avoid crowding, misalignment, and binding of the pallets on the rails of the upper run.

In sinter apparatus of the now general type, the sintering machine, and sinter cooler, include upper rails which support moving loaded pallets, for sintering or cooling, from a feed end to a discharge end of the rails. The pallets pass over wind boxes as they move along the rails on wheels at two opposite sides of the pallets. At the discharge end the pallets move down a slope and are emptied by gravity flow, following which they move by gravity further downward and back along lower rails up to a region beneath the feed end of the machine, where they are picked up by power-operated sprockets that lift the pallets up and carry the pallets on through the rest of an arcuate path to re-enter the upper rails, whereupon the sprocket teeth push entering pallets against the preceding pallets on the upper run so as to move them all along the upper run as the sprocket teeth leave the pallets.

The sprockflets, sprocket teeth, and the sockets for the two opposite sides of the pallets, are driven in unison by a common drive shaft and are assembled so as to have their center lines exactly in line with each other as companion pairs, in order to move the pallets in parallelism along the rails.

In actual practice, it has been found that in operation, it is not possible for the assembly to remain in parallelism at all times, and that it is necessary from time to time to readjust the sprocket drive to the rails to reattain the desired parallelism of the pallets on the rails, particularly in the upper run, in which the sintering or cooling takes place. The pallets tend to ride against one side or the other of the rails on which the pallets roll along on the pairs of wheels at each side of each pallet. This results in excessive wear of the rails and pallet wheels on the side at which they tend to ride.

As a consequence of the biased or canter position that the pallets tend to assume, the assembly must be frequently repaired, due to undue wear, and sintering and cooling is not smoothly and properly attained. As a result, the cost of maintaining and operating this type of apparatus has been quite high, and different ways are still sought for attaining continuity of operation for longer periods of time, with less down time, due to this difficulty, in a simple manner that does not introduce other disadvantageous features of operation and maintenance.

There are a number of factors that contribute to this misalignment of the pallets in operation, such as the torque lag inherent in the common drive shaft, the necessity for tolerances for moving and interacting parts, abrasive dust and differences in temperature of the different parts of the system.

The weights of the loaded pallets, their great widths relative to their very short lengths, and the extreme length of the upper run as high as two hundred and fifty feet with modern pelletized ore sinter systems accentuate the aforesaid objectional conditions which contribute to misalignment.

It is not possible to anticipate how long the pallets will remain in the parallelism, or which direction the angle of misalignment may take. A newly-assembled machine may, or may not, require adjustment. After operation for a period of time, say six months, subsequent adjustment is often necessary in addition to any initial adjustment in newly assembling the system of parts.

For such adjustment, past practice has been, either to shift the bearings for the sprocket shaft horizontally, in order to advance, or retard the teeth on one side relative to the top pallet train in the upper run, or to shift one sprocket wheel arcuately, or to shift its teeth arcuately on the sprocket wheel to offset the teeth on one wheel relative to the teeth on the companion sprocket wheel.

Two main objections to the shift of the bearings for this purpose are (a) there is not a uniform change in the relationship between the sprocket teeth and the tooth pockets of the pallets, when moving the bearings. Thus, if one bearing were moved toward the pallet train, the top tooth of the sprocket would push against the driving surface on the pallet and move it forward, while the bottom tooth would move away from the driving surface of a pallet in the lower train and delay the time of engagement with the driving surface. It should be realized that only a radial adjustment would result in a uniform advancing or retarding of all teeth; (b) shifting one bearing horizontally with respect to the other skews the main drive shaft and produces misalignment between the main drive gear and pinion with adverse affects on bearings and tooth surfaces.

Correction for adjustment by shifting the sprocket teeth arcuately along the wheel relative to the correspondingly paired teeth on the companion sprocket wheel, works satisfactorily from the standpoint of attaining true parallelism, but the necessity for arcuate movement of the teeth roots or legs relative to those as set up in the companion sprocket wheel, is subject to the following objections:

Rotation of the sprocket wheel on its shaft relative to the other sprocket wheel on the shaft will change the position of the alignment teeth to compensate for the angularity of the pallets. However, this entails the use of a flanged sprocket shaft with several sets of matching holes which permit rotating one sprocket with respect to the other. The design is very expensive and changing the sprocket settings requires considerable amount of labor.

Rotation of the sprocket teeth along the wheel around its axis, as by adjusting oppositely acting abutting screw bolts against the leading and trailing edges of the legs of removable teeth, entails the use of uniform teeth. Rotating rings that carry the teeth along the perimeter of the wheel and around the axis of the driving shaft, also entails unfirm seating of the teeth in fixed position in the wheels and also does not lend itself to shearing of the individual teeth and replacement of such teeth individually when occasion requires it.

In accordance with the present invention, the driving means for the pallets is effective to be changed at will to correct the movement of the top line of pallets under load on the upper strand, so that they move in parallelism with each other and with the rails, by means of removable individual teeth in tooth sockets on the wheels, without shifting of the teeth arcuately relative to the driving shaft, either by shifting the wheel relative to the shaft, or moving the teeth along the rim of the wheel. With the present invention the adjustment is made by shifting the position of the leading and trailing edges of the teeth relative to the vertical axis of the roots of the teeth while maintaining the root or leg segments of the teeth of the same length and in the same angular position relative to the drive shaft for the companion wheels.

Accordingly, the present invention provides a pair of sprocket wheels, each with corresponding tooth sockets of the same angular displacement and position around the axis of the wheels, and at least three groups of sprocket teeth for each wheel, with the teeth of each group all having the same circular pitch and circular thickness but with their leading and trailing edges at different distances along the vertical axis of their root segments from the distances of the leading and trailing edges of the teeth of the other two groups.

Preferably, the teeth of one group all have their leading and trailing edges equidistant from the vertical axis of their root segments, the teeth of another group all have their leading edges further from their vertical axes than their trailing edges, and the teeth of still another group have their leading edges at a still further distance from the vertical axes than their trailing edges.

In addition, the sprocket teeth are all reversible and interchangeable with each other in the sockets on both sprocket wheels.

The invention has, for further objects, such other improvements and advantages in construction and operation as may be found to obtain from the following description, taken in conjunction with the accompanying drawings, in which:

FIGURE 1 is a side elevational view diagrammatically illustrating a sintering machine embodying the present invention;

FIGURE 2 is a fragmentary plan view illustrating the common drive mechanism for the machine;

FIGURE 3 is an enlarged fragmentary vertical cross-sectional view taken on the line III—III of FIGURE 2 showing one of the sprockets with the set of teeth thereon, all having their leading and trailing edges equidistant from the vertical axis through their root segments;

FIGURE 4 is a view similar to FIGURE 3, but taken through the other sprocket on the line IV—IV of FIGURE 2, and showing all the teeth having their leading edges at a greater distance than their trailing edges from their vertical axes, as illustrated by tooth "C";

Figure 5:
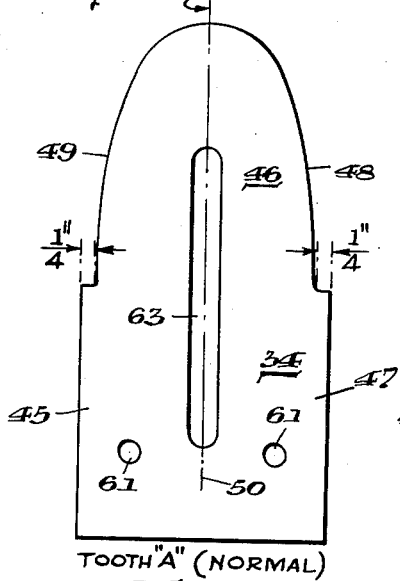
Figure 6:
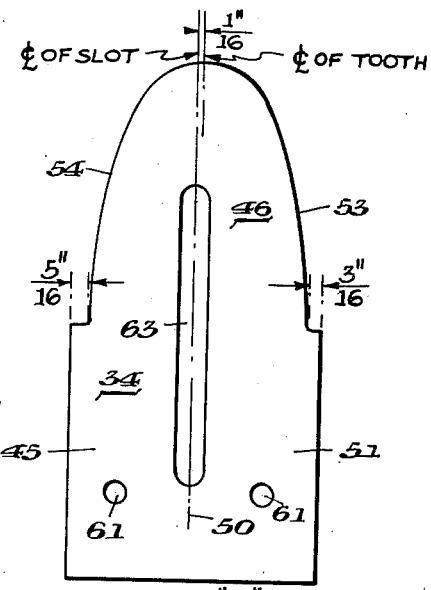
Figure 7:
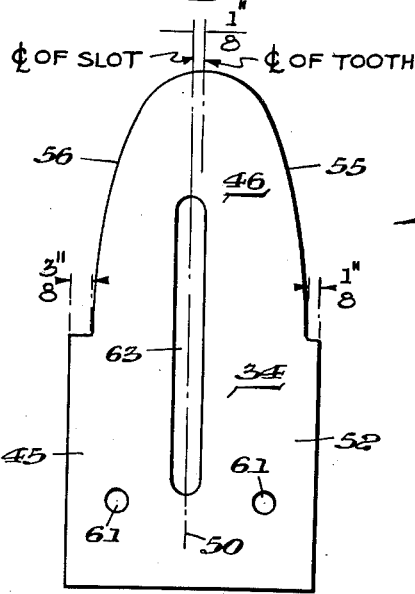
Figure 8:
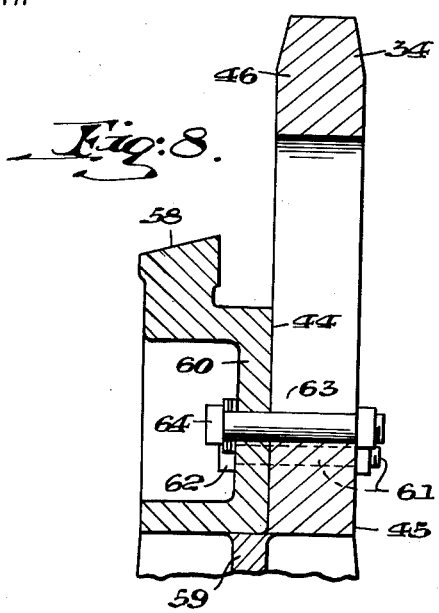

FIGURES 5, 6, and 7 are side elevational views of one of the teeth of each of the three groups, as embodied in the present invention;

FIGURE 8 is an end elevational view of the teeth as shown in FIGURES 5 to 7.

Figure 9:
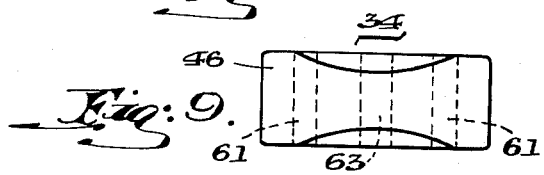

FIGURE 9 is a top plan view of the tooth as shown in FIGURE 8;

FIGURES 10 and 11 are fragmentary views of corresponding parts of FIGURES 3 and 4, but showing the difference in relationship between the leading and trailing edges of the corresponding teeth in the two sprocket wheels, the teeth in both wheels having their leading edges a greater distance than their trailing edges from the vertical axis of the root segment, with the teeth, such as a tooth "C," in one wheel having their leading edges a greater distance, whereas the teeth, such as a tooth "B" in the other wheel, have their corresponding leading edges at a lesser distance.

FIGURES 12 and 13 are fragmentary views of corresponding parts of FIGURES 3 and 4 but showing the difference in relationship between the leading and trailing edges of the corresponding teeth in the two sprocket wheels, the teeth, such as a tooth "B," in one wheel having the leading edges a greater distance from their vertical axes than the trailing edges of the teeth, and the teeth, such as tooth "C" turned over in the other wheel, having the leading edges a lesser distance from their vertical axes than the trailing edges of the teeth.

FIGURE 14 is a schematic view illustrating the various settings available with the three groups of teeth as embodied in the present invention.

Referring to the drawings, and more particularly, to FIGURES 1–4, showing sinter apparatus of the Dwight-Lloyd type, the apparatus comprises a pair of upper rails 16, 17, and lower rails 18, 19, extending from the feed end 20 to the discharge end 21 of the machine. As shown, the apparatus is of the type designed for sintering of ore on pallets 25 when in the upper run on the rails 16, 17. For convenience, the invention will be confined to this use of the invention. It will be understood that the invention is also applicable to the like endless strand cooler systems in which the upper strand is used for cooling of hot sinter rather than for sintering, in which case, a different feed means is employed for depositing the hot sinter on the pallets at the feed end, and an igniter as hereinafter noted is, of course, omitted.

For sintering, a feeder 22 for ore and an igniter 23, is provided at the feed end 20, and a crusher or breaker (not shown) is also provided at the discharge end 21.

The lower pair of rails 18 and 19 are inclined from the discharge end 21 downwardly toward the feed end 20 to enable the pallets 25 to move under their own weight by gravity from the discharge end 21 up to the arcuate level 24 at the feed end 20 of the machine for return of the pallets from that level 24 up to the upper strand 16, 17 by means in the form of sprocket wheels 30, 31. A plurality of pallets 25 are mounted for movement along the upper and lower rails, and each pallet 25 has a pair of wheels 27 at each side which ride on the corresponding rails. At the discharge end 21 of the machine, the upper and lower rails are reversely curved to form overlapping spaced arcuate guide rails 28 for guiding wheels of the pallets from the upper rails down onto the lower rails. At the feed end 20 of the machine, the upper and lower rails are likewise disposed to form arcuate guide rails 29 for guiding the wheels of the pallets during return of the pallets from the lower run to the feed end of the upper run or pair of rails. At the re-entry end 20, the sprockets 30, 31, as customary, constitute means for lifting the pallets up around the guide rails 29 from the arcuate level 24, and for urging the pallets along the upper run in abutting relation in parallelism. This means, as conventional, comprises a pair of sprocket wheels 30, 31 rotatable in unison, and each provided with an annular series of teeth 34 for engaging corresponding lifting parts 33 on the opposite sides of the respective pallets 25, for lifting them from the arcuate level 24 above the lower run to the upper run, and for pushing them along the upper rails 16, 17. Each tooth 34 on one sprocket wheel 30 is paired with one of the teeth 34 on the other sprocket wheel 31 to form successive pairs of teeth for engaging the lifting parts 33 on opposite sides of the pallets 25 in succession, for the purpose of accomplishing the lifting and pushing of the pallets, as aforesaid.

For rotating the sprocket wheels in unison, there is provided, as shown in FIGURE 2, as conventional, a sprocket shaft 36 rotatably mounted in a pair of bearings 37 and a spur gear 38 connected to the sprocket shaft 36 and to a drive pinion 39 mounted on a shaft 40 which is driven by a suitable power means 41 which generally comprises an electric motor 14 with a gear reducer 15. Each sprocket is connected to the sprocket shaft 36 for rotation in unison therewith by means of keys 42. The sprocket teeth 34 on each sprocket wheel 30, 31 are equally spaced from each other around the periphery of the sprocket wheel and the corresponding teeth on the two sprocket wheels are paired so that each root 45 of a pair is of the same circular thickness and pitch or angular displacement and same angular position.

With this general construction and arrangement of parts, the pallets 25 move on their wheels 27 continuously progressively along the upper rails 16, 17, which are normally intended to be horizontal and in parallelism with each other, under the action of a pair of the sprocket teeth 34 from the feed end 20 to the discharge end 21 of the machine. The pallets are filled by the feeder indicated diagrammatically at 22 with a uniform layer of material to be sintered (or cooled when embodied as a sinter cooler).

As the pallets 25 move along the upper rails 16, 17, the material is ignited by a burner, as indicated diagrammatically at 23, when the apparatus is designed for sintering. Following this, the pallets move over wind boxes 43, both in sintering and in cooling. In sintering, the air is drawn downwardly from above the bed of material on the pallets 25 by exhaust means, not shown, to cause the ore to sinter. In cooling, the hot bed of sinter may be cooled either by downdraft or upflow of air through the wind boxes 43. At the discharge end 21 of the apparatus, the sinter pallets pass between the arcuate guide rails 28, dump the sinter, and move down further to the lower rails 18, 19 under their own weight and are carried in an inverted position by the lower rails 18, 19. The latter rails being inclined, the inverted pallets roll by gravity toward the sprocket wheels 30, 31. Generally, the number of pallets used is such that some pallets 25 are between the guide rails 28 at the discharge end 21, and their weight is also utilized to urge the pallets down the incline toward the sprockets 30, 31 and part way up the arcuate guide rails 29 to the level 24. As the sprockets rotate, each tooth 34 of a pair engages the lifting parts 33 at the opposite sides of one of the pallets at the level 24 as they successively present themselves to the sprocket wheels for lifting at the level 24. Thus, each pair of transversely spaced apart teeth 34 of the pair of sprocket wheels 30, 31, successively lift one of the pallets at the level 24 up and around the rest of the arcuate guides 29 and on to the upper rails 16, 17 where they push the pallets 25 along as the individual pairs of sprocket teeth 34 rotate out of engagement with the lifting parts 33. With the conventional type of apparatus as above-described, the aim is to have the pallets 25 engage the paired sprocket teeth 34 at the level 24 in true parallelism, and to leave the sprocket teeth 34 in the upper run in true parallelism. However, when a newly-assembled apparatus is started up into operation, or after some months of operation, with the pallets 25 moving in true parallelism, it will be found that the upper run pallets crowd the right-hand rails 17. In such entrances, the left-hand rail 16 sides of the pallets assume a position slightly ahead of the right-hand side. In these positions, with the pallets biased relative to the rails as indicated in the dotted lines in FIGURE 2, abrasion and undue wear soon becomes excessive and leakage of the cooling air and burning gases takes place, resulting in uneven cooling or sintering of the material on the pallets. Such abrasion and wear often accentuates the unevenness in movement in the pallets 25 and thus, cumulatively increases the abrasion, wear and non-uniformity in sintering or cooling of the material on the pallets. Often, the pallets will again crowd, but against the opposite rails in the upper run, and also, the sides of the pallets that were leading in the upper run, become the trailing sides in the upper run. Such changes in movement require reconstitution of the equipment and often entails the use of different parts to institute a new and different mode of operation at some time or other in the general operation of the apparatus as a whole, in order to maintain the pallets 25 in true parallelism in the upper run.

In accordance with the present invention, the sprocket drive mechanism is designed for readily altering the general mode of operation of the apparatus for the purpose of preventing and overcoming the aforesaid misalignment, crowding, binding, and biased condition of the pallets, in a simple, economical, and facile way, which avoids shifting of the bearings 37, or movement of the sprocket teeth 34 arcuately of the sprocket wheels 30, 31, or even shifting of the sprocket wheels 30, 31 arcuately relative to their sprocket shaft 36 for the same purpose. The novel equipment of the present invention also has the advantage of retaining the principle commonly used in this art for sintering of removable sprocket teeth reversibly and interchangeably mounted immovably in fixed sockets 44 disposed in fixed angular position in the sprocket wheels, as described and claimed in the common assignee's United States Patent No. 2,534,186, dated December 12, 1950, to W. J. Urban.

For the purpose of the present invention, at least three sets, 47, 51, 52, of the removable and interchangeable sprocket teeth 34, are provided, as seen in FIGURES 5–8, and 14, all of which have their teeth roots or legs 45 of the same angular displacement or circular pitch, so that they may be, as customarily, interchangeably mounted in any of the sockets 44 of like fixed dimension on the wheels 30, 31, and be received immovably therein, in pairs, with the paired sockets 44 always still in the same angular position around the common axis 36 of the wheels, for driving the paired sockets 44, and hence, the paired roots 45 of the paired teeth 34, in parallelism.

The portions of the three groups of teeth 34 above the roots 45, i.e., the heads or addendums 46, are differently constituted as to the circular position of their leading and trailing edges, while the circular thickness of the addendum of the teeth is the same. The circular thickness of the addendum 46 is slightly less than the circular thickness of their roots 45. One group of teeth 47 has their leading 48 and trailing 49 edges equidistant from their vertical axes 50. The teeth of the other two groups, 51, 52, have their leading and trailing edges unequidistant from the vertical axes 50 of their teeth, with the leading edges 53 of the teeth of one unequidistant group 51 further from their vertical axes 50 than their trailing edges 54 and the leading edges 55 of the teeth of the other unequidistant group 52 still further from their vertical axis 50 than their trailing edges 56.

Referring to FIGURES 1 to 4, the pair of sprockets 30, 31 are constructed alike. Each is keyed by a pair of keys 42 to a common sprocket shaft 36. In the rim or perimeter 58, FIGURE 8, means are provided for fixing the sprocket teeth immovably on the wheels, in the form of rectangular slots 44 in one side face of the rim. These slots 44 open outwardly at the outermost part of the perimeter of the wheels 30, 31, and are located in equally spaced relation midway between equally spaced spokes 59 in the wheels. Each slotted rim portion 60 is provided with three holes for attachment of the teeth thereto, the lower pair of holes 61 being for reception of shear bolts 62, and the upper holes 63 for a shoulder bolt 64. The circular width of each of the slots 44 is the same, and the height is such as to contain the legs or roots 45 of the teeth. Hence, each tooth slot 44 is in fixed angular position around the axis of the wheels 30, 31, and all are of the same circular thickness. One key 42 of each wheel is disposed to key the wheels 30, 31 to the common sprocket shaft 36 on a vertical axis 50 coinciding with the vertical axis of the root 45 of one of the sprocket teeth 34 thereon and so as to be exactly in line with the center line of the root 45 of the tooth 34 on the other wheel of the pair.

Each of the teeth 34 of the three groups 47, 51, 52, is constituted of a leg or root section 45 of the same circular width as that of the sockets 44 for removable and interchangeable attachment by means of the shear bolts 62 and the shoulder bolt 64 through the bolt holes corresponding to the bolt holes 61, 63 in the slotted rim portions 60. The head or addendum portion 46 of all the teeth 34 of these groups 47, 51, 52, are of the same circular thickness, but of less angular displacement or circular width than the angular displacement, circular width or thickness of the respective roots 45. One group of teeth 47 has their leading 48 and trailing 49 edges equidistant from the vertical center or axis 50 of the root 45.

Another group 51 has the leading edges 53 of the teeth further from the vertical centre or axis 50 of their roots 45 than their trailing edges 54. The third group 52 of teeth has the leading edges 55 of the teeth at a still further distance from the vertical center or axis 50 of their roots 45 than their trailing edges 56. As the action of the pallets is not accurately predictable, with a newly-assembled machine or cooler, it is necessary to operate the machine first, to determine what position the pallets will assume. For this, the apparatus is first assembled with both wheels 30, 31 having the teeth of the group 47, with their leading 48 and trailing 49 edges equidistant from the vertical axis 50 of their roots 45. When the pallets 25 are found to operate in true parallelism, these teeth of set 47 are left on both the wheels 30, 31, and the apparatus, whether it be a sintering machine or cooler, is continued in operation as thus first assembled with this group of teeth 47 until it becomes necessary to make subsequent adjustment of the general mode of operation through the sprocket wheels, as a result of either a wearing away of parts, or some other effect, causing the pallets 25 to ride against the rails 16, 17, on one side or the other in the upper run.

After the sprockets 30, 31 have been adjusted by replacement with teeth of the groups 51 or 52, to prevent objectionable crowding of the pallets, the pallets 25 will move smoothly along the rails and abrasion, and wearing away of the parts is greatly reduced. This increases the life of the parts and reduces the cost of repairs and the time required for maintaining the machine in proper order. At least, at times, it will be necessary to make subsequent adjustments of the sprocket wheel drive through replacement of the groups 47, 51, 52, as a result of the wearing away of the parts. These subsequent adjustments are, in addition to the adjustment, required to have a newly-assembled machine function properly. When adjusting the drive by either wheel 30, 31, all of the teeth are changed from one group 47, 51, or 52, to one of the other of these groups. As seen in FIGURE 2, when the pallets 25 on the upper run rails 16, 17 tend to ride against the right-hand side rail 17, when the sprocket wheel 31 for that side of the pallets 25 is affixed to the sprocket shaft 36 at a remote distance from the gear-driven end 38 of the shaft 36, the teeth of the group 47, as first installed with their leading 48 and trailing 49 edges equidistant from the vertical axes 50 of their roots 45, are left in place on the sprocket wheel 31 at the left-hand rail 16 side, which wheel 31 is affixed to the sprocket shaft 36 closer to the driving spur gear 38, but the set of teeth in the sprocket wheel 30 at the right-hand rail 16 side are replaced with teeth of the set 51 or 52 having their leading edges 53 or 55 further from the vertical axis 50 of their roots 45, and their trailing 54 or 56 edges closer to said axis 50. This will often ensure that the pallets 25 move in true parallelism. Should the pallets 25 tend to ride against the left-hand side rail 16, then a like substitution of teeth for the left-hand sprocket 31 will alter the mode of operation to attain the desired parallelism of the pallets. As seen in FIGURES 2, 12, and 13, should the pallets in the upper run assume a like biased position, with respect to the right-hand side rail 17, causing the pallets 25 to ride against the left-hand rail side 16 in the upper run, the teeth of the group 47 on both sprocket wheels are replaced with the group of teeth 51 on the left-hand side wheel 31 so as to have their leading edges 53, that are further from the vertical axis 50 of their roots 45, act as leading edges with their edges 54 acting as their trailing edges closer to said root axes, and the teeth on the right-hand side 30 are replaced with the group of teeth 52 but having their teeth reversed so that their leading edges are the edges 56 that are closer to the vertical axes 50 of their roots 44, and their trailing edges then are edges 55 that are further from said axes.

This re-establishes the movement of the pallets in true parallelism along the upper run. There is no retarding of the movement of the pallets in the lower run on the rails 18, 19 where they approach the sprocket wheels 30, 31 for relifting up to and upon the upper rails, since the pallets move solely under gravity of subsequent pallets 25 as they are carried part way around the axis of the sprocket shaft 36 from the lower run back up to the level 24, and are urged forwardly along the rails in the lower run so that the teeth 34 do not engage the lifting surface 33 until the level 24 is reached.

Thus, by changing the teeth 34 on one or both of the sprocket wheels to provide thereon teeth with identical roots 45 that all have the leading and trailing edges of their addendums 46 at different distances from the vertical axes 50 of their tooth roots 45, as seen in FIGURES 3 and 4, and in FIGURES 10 and 11, and more particularly, by providing, as in FIGURES 12 and 13, one sprocket 30 or 31 with teeth 34 that have identical roots 45 and all having their leading edges further from the vertical axis 50 of their roots 45 than their trailing edges, and providing the other sprocket wheel 30 or 31 with teeth 34 that likewise have identical roots 45 identical with each other and with the roots of the teeth on the other sprocket wheel, and all having their leading edges closer to the vertical axis of their roots than their trailing edges, parallelism is maintained in the upper run without shifting of the bearings 38, wheels 30, 31, or teeth 34 on one wheel 30 relative to the other wheel 31.

The invention as hereinabove set forth is embodied in a particular form of construction but may be variously embodied within the scope of the claims hereinafter made.

What is claimed is:

1. In apparatus for continuously treating sinter material, the combination comprising: a plurality of pallets for supporting such material; upper rail means for supporting a plurality of said pallets for movement in parallelism therealong while supporting the material being treated; lower rail means supporting a plurality of empty pallets for return movement in parallelism therealong in an opposite direction; power actuated sprocket means at one end of the rail means and rotatable about a horizontal transverse axis to lift pallets returning along the lower rail means arcuately to the upper rail means and to push the pallets along the upper rail means; said sprocket means including a rotatable support for sprocket teeth rotatable on said axis; two annular sets of spaced apart pairs of teeth arranged in fixed predetermined angular positions about the periphery of the support with the teeth of one set in the same angular position as the teeth of the other set to adapt them to engage the opposite sides of the pallets with the leading edges of the teeth of one set ahead of the leading edges of the corresponding teeth of the other set; the teeth of each set all having roots of identical angular displacement, and addendums, each of the addendums having the same circular thickness, the circular thickness of the addendums being less than the circular thickness of the roots, and the teeth of at least one set all having their leading and trailing edges at different distances from the vertical axis of their roots; and releasable means for affixing the teeth roots in said fixed predetermined angular positions on the support and operable to permit interchange of said teeth relative to said support.

2. Apparatus as claimed in claim 1, and in which the other teeth of each pair of teeth have their leading and trailing edges equidistant from the vertical axis of their root.

3. In apparatus for continuously treating sinter material, the combination comprising: a plurality of pallets for supporting such material; upper rail means for supporting a plurality of said pallets for movement in parallelism therealong while supporting the material being treated; lower rail means supporting a plurality of empty pallets for return movement in parallelism therealong in an opposite direction; power actuated sprocket means at one end of the rail means and rotatable about a horizontal transverse axis to lift pallets returning from the lower rail means arcuately up to the upper rail means to push the pallets along the upper rail means; said sprocket means, including a rotatable support for sprocket teeth, rotatable on said axis; two annular sets of spaced apart pairs of teeth arranged in fixed predetermined angular position about the periphery of the support and with the teeth of each pair in the same angular position to adapt them to engage the opposite sides of the pallets with the leading edges of the teeth of one set ahead of the leading edges of the corresponding teeth of the other set; the teeth of each set being immovable in an arc about said axis relative to the teeth of the other set on the support, and having roots of identical angular displacement and addendums, each of the addendums having the same circular thickness, the circular thickness of the addendums being less than the circular thickness of the roots, and all the teeth of at least one set having their leading and trailing edges at different distances from the vertical axis of their roots; and releasable means for affixing the immovable teeth roots in said fixed predetermined angular positions on the support and operable to permit replacement of said immovable teeth relative to said support.

4. In apparatus for continuously treating sinter material, the combination comprising: a plurality of pallets for supporting such material, each pallet including a sprocket tooth engaging part adjacent each side; upper rail means supporting a plurality of pallets for movement in parallelism therealong while supporting the material; lower rail means supporting a plurality of empty pallets for return movement in parallelism therealong in an opposite direction under the influence of gravity; and rotatable power actuated sprocket means at one end of the rail means, including two annular series of spaced apart pairs of teeth arranged in fixed predetermined angular positions about the periphery of the sprocket means, with the teeth of each pair in the same angular position and with the leading edges of the teeth of one set ahead of the leading edges of the corresponding teeth of the other set for successively engaging the engaging parts of the pallets and lifting the pallets in parallelism from the lower rail means through an arcuate path to the upper rail means and pushing the pallets in parallelism along the upper rail means; the teeth of each pair having roots of identical angular displacement and addendums, each of the addendums having the same circular thickness, the circular thickness of the addendums being less than the circular width of the roots, and the roots of each pair being in the same angular position; and one tooth of each pair of teeth having the leading edge of its addendum at a greater distance from the vertical axis of its root than the trailing edge thereof.

5. Apparatus as claimed in claim 4, and in which the other teeth of each pair of teeth have their leading and trailing edges equidistant from the vertical axis of their root.

6. In apparatus for continuously treating sinter material, the combination comprising: a plurality of pallets for supporting such material, each pallet including a sprocket tooth engaging part adjacent each side; upper rail means supporting a plurality of pallets for movement in parallelism therealong while supporting the material being treated, lower rail means supporting a plurality of empty pallets for return movement in parallelism therealong in an opposite direction under the influence of gravity; and rotatable power actuated sprocket means at one end of the rail means, including two annular series of spaced apart pairs of teeth arranged in fixed predetermined angular positions about the periphery of the sprocket means with the teeth of each pair in the same angular position, and with the leading edges of the teeth of one set ahead of the leading edges of the corresponding teeth of the other set for successively engaging the engaging parts at opposite sides of the pallets and lifting the pallets in parallelism from the lower rail means through an arcuate path to the upper rail means and pushing the pallets in parallelism along the upper rail means; the teeth of each pair having roots of identical angular displacement and addendums, each of the addendums having the same circular thickness, the circular thickness of the addendums being less than the circular width of the roots, and the roots of each pair being in the same angular position; and one tooth of each pair of teeth having the trailing edge of its addendum at a greater distance from the vertical axis of its root than the leading edge thereof.

7. In apparatus for continuously treating sinter material, the combination comprising: a plurality of pallets for supporting such material, each pallet including a sprocket tooth engaging part adjacent each side; upper rail means supporting a plurality of pallets for movement in parallelism therealong while supporting the material; lower rail means supporting a plurality of empty pallets for return movement in parallelism therealong in an opposite direction under the influence of gravity; and rotatable power actuated sprocket means at one end of the rail means, including two annular series of spaced apart pairs of teeth arranged in fixed predetermined positions about the periphery of the sprocket means with the leading edges of the teeth of one set ahead of the leading edges of the correspnoding teeth of the other set for successively engaging the engaging parts at the opposite sides of the pallets and lifting the pallets from the lower rail means to the upper rail means and pushing the pallets along the upper rail means; the teeth of each pair having roots of identical angular displacement and addendums, each of the addendums having the same circular thickness, the circular thickness of the addendums being less than the circular width of the roots, and the roots of each pair being in the same angular position; and one tooth of each pair of teeth having the leading edge of its addendum at a greater distance from the vertical axis of its root than the trailing edge thereof and the other tooth of each pair of teeth have their leading and trailing edges equidistant from the vertical axis of their roots.

8. In apparatus for continuously treating sinter material, the combination comprising: a plurality of pallets for supporting such material; upper rail means for supporting a plurality of said pallets for movement in parallelism therealong while supporting the material being treated; lower rail means supporting a plurality of empty pallets for return movement in parallelism therealong in an opposite direction; power actuated sprocket means at one end of the rail means and rotatable about a horizontal transverse axis to lift the pallets returning along the lower rail means arcuately to the upper rail means and to push the pallets along the upper rail means; said sprocket means including a rotatable support for sprocket teeth rotatable on said axis; two annular sets of spaced apart pairs of teeth arranged in fixed predetermined angular position about the periphery of the support and adapted to engage the opposite sides of the pallets with the leading edges of the teeth of one set ahead of the leading edges of the corresponding teeth of the other set; the teeth of each set all having roots of identical angular displacement and addendums, each of the addendums having the same circular thickness, the circular thickness of the addendums being less than the circular thickness of the roots, and each set comprising at least three groups of interchangeable teeth, all the teeth of each group having their leading and trailing edges at distances from the vertical axis of their roots that are different from the distance of said edges on teeth of the rest of the groups; and releasable means for affixing the teeth roots in said first predetermined angular positions on the support and operable to permit interchange of said teeth relative to said support.

References Cited in the file of this patent
UNITED STATES PATENTS

| | | |
|---|---|---|
| 2,534,187 | Urban | Dec. 12, 1950 |
| 2,647,615 | Cover | Aug. 4, 1953 |